(12) United States Patent
Park et al.

(10) Patent No.: US 9,981,417 B2
(45) Date of Patent: May 29, 2018

(54) APPARATUS AND METHOD OF MANUFACTURING DISPLAY APPARATUS

(71) Applicant: SAMSUNG DISPLAY CO., LTD., Yongin-si, Gyeonggi-do (KR)

(72) Inventors: Sehun Park, Yongin-si (KR); Junho Kwack, Yongin-si (KR); Yanghan Son, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days. days.

(21) Appl. No.: 15/269,816

(22) Filed: Sep. 19, 2016

(65) Prior Publication Data

US 2017/0225385 A1    Aug. 10, 2017

(30) Foreign Application Priority Data

Feb. 5, 2016  (KR) .......................... 10-2016-0014657

(51) Int. Cl.
| | |
|---|---|
| *B29C 51/30* | (2006.01) |
| *B29C 51/08* | (2006.01) |
| *B29C 51/26* | (2006.01) |
| *B29C 65/70* | (2006.01) |
| *B29L 31/34* | (2006.01) |

(52) U.S. Cl.
CPC .............. *B29C 51/30* (2013.01); *B29C 51/08* (2013.01); *B29C 51/265* (2013.01); *B29C 65/70* (2013.01); *B29L 2031/3475* (2013.01)

(58) Field of Classification Search
CPC ....... B29C 51/08; B29C 51/265; B29C 65/70; B29C 51/30; B29L 2031/3475
See application file for complete search history.

(56) References Cited

FOREIGN PATENT DOCUMENTS

| KR | 10-2014-0002491 A | 1/2014 |
|---|---|---|
| KR | 10-1486861 B1 | 1/2015 |
| KR | 10-2015-0012593 A | 2/2015 |
| KR | 10-2015-0048547 A | 5/2015 |
| KR | 10-2015-0077164 A | 7/2015 |

OTHER PUBLICATIONS

Machine translation of KR 10-20150048547A.; Publication date May 7, 2015.*

* cited by examiner

*Primary Examiner* — Vishal I Patel
(74) *Attorney, Agent, or Firm* — Lewis Roca Rothgerber Christie LLP

(57) ABSTRACT

An apparatus for and a method of manufacturing a display apparatus are provided. The apparatus includes a first mold configured to accommodate a window; a second mold configured to accommodate a panel member and to bond the window and the panel member to each other; and a guide roller on the first mold. The second mold faces the first mold and has a variable shape. The guide roller is rotatable and is configured to maintain tension in the panel member as the window and the panel member are bonded to each other.

9 Claims, 9 Drawing Sheets

APPARATUS AND METHOD OF MANUFACTURING DISPLAY APPARATUS

CROSS-REFERENCE TO RELATED APPLICATION

This application claims priority to and the benefit of Korean Patent Application No. 10-2016-0014657, filed on Feb. 5, 2016 in the Korean Intellectual Property Office, the disclosure of which is incorporated herein in its entirety by reference.

BACKGROUND

1. Field

One or more embodiments relate to an apparatus for and a method of manufacturing a display apparatus.

2. Description of the Related Art

Mobile electronic devices have been widely used. For example, mobile electronic devices, such as tablet personal computers (PCs), in addition to small-sized electronic devices, such as mobile phones, have been widely used recently.

Such a mobile electronic device generally includes a display apparatus in order to support various functions or to provide a user with visual information, such as images and videos. Recently, components for driving a display apparatus have been miniaturized, and also, importance of the display apparatus in electronic devices has been increasing. In addition, a structure that may be bent (e.g., bent from a flat state to have an angle) has been also developed.

SUMMARY

One or more embodiments include an apparatus for and a method of manufacturing a display apparatus having improved quality. When a panel member is attached to a curved window (e.g., a window having a curvature on at least a part thereof) using a typical apparatus and method, an adhesive force between the curved portion of the window and the panel member may be degraded and defects in the display apparatus may occur.

Additional aspects will be set forth, in part, in the description which follows and, in part, will be apparent from the description or may be learned by practice of the presented embodiments.

According to one or more embodiments, an apparatus for manufacturing a display apparatus includes: a first mold configured to accommodate a window; a second mold configured to accommodate a panel member and to bond the window and the panel member to each other; and a guide roller on the first mold. The second mold faces the first mold and has a variable shape. The guide roller is rotatable and is configured to maintain tension in the panel member as the window and the panel member are bonded to each other.

The apparatus may further include a driver connected to at least one of the first mold and the second mold and configured to move the first mold and the second mold relative to each other.

The guide roller may be arranged to contact an end of the panel member.

The second mold may include silicone.

The guide roller may be configured to rotate when the second mold reaches a certain location.

The guide roller may include: a core; and an outer cover on an external surface of the core.

The apparatus may further include a support between the first mold and the second mold to support opposite ends of the panel member.

The panel member may be flexible.

The panel member may include a display panel, a touch panel, and/or a functional film.

According to one or more embodiments, a method of manufacturing a display apparatus includes: mounting a window on a first mold; arranging a panel member between the first mold and a second mold such that opposite ends of the panel member are supported by a supporter; and linearly moving at least one of the first mold and the second mold so that at least one of the opposite ends of the panel member contacts a guide roller.

The method may further include further linearly moving the at least one of the first mold and the second mold so that a portion of the panel member contacts the window.

The method may further include bonding the window and the panel member to each other beginning at the portion of the panel member and proceeding toward opposite ends of the panel member by further linearly moving the at least one of the first mold and the second mold.

The guide roller and the panel member may be spaced from each other after the bonding of the panel member and the window to each other is performed to a certain distance from the portion of the panel member.

The portion of the panel member may be a center portion of the panel member.

The panel member may be flexible.

The panel member may include a display panel, a touch panel, and/or a functional film.

BRIEF DESCRIPTION OF THE DRAWINGS

These and/or other aspects will become apparent and more readily appreciated from the following description of exemplary embodiments, taken in conjunction with the accompanying drawings, in which.

DETAILED DESCRIPTION

Figure 1:
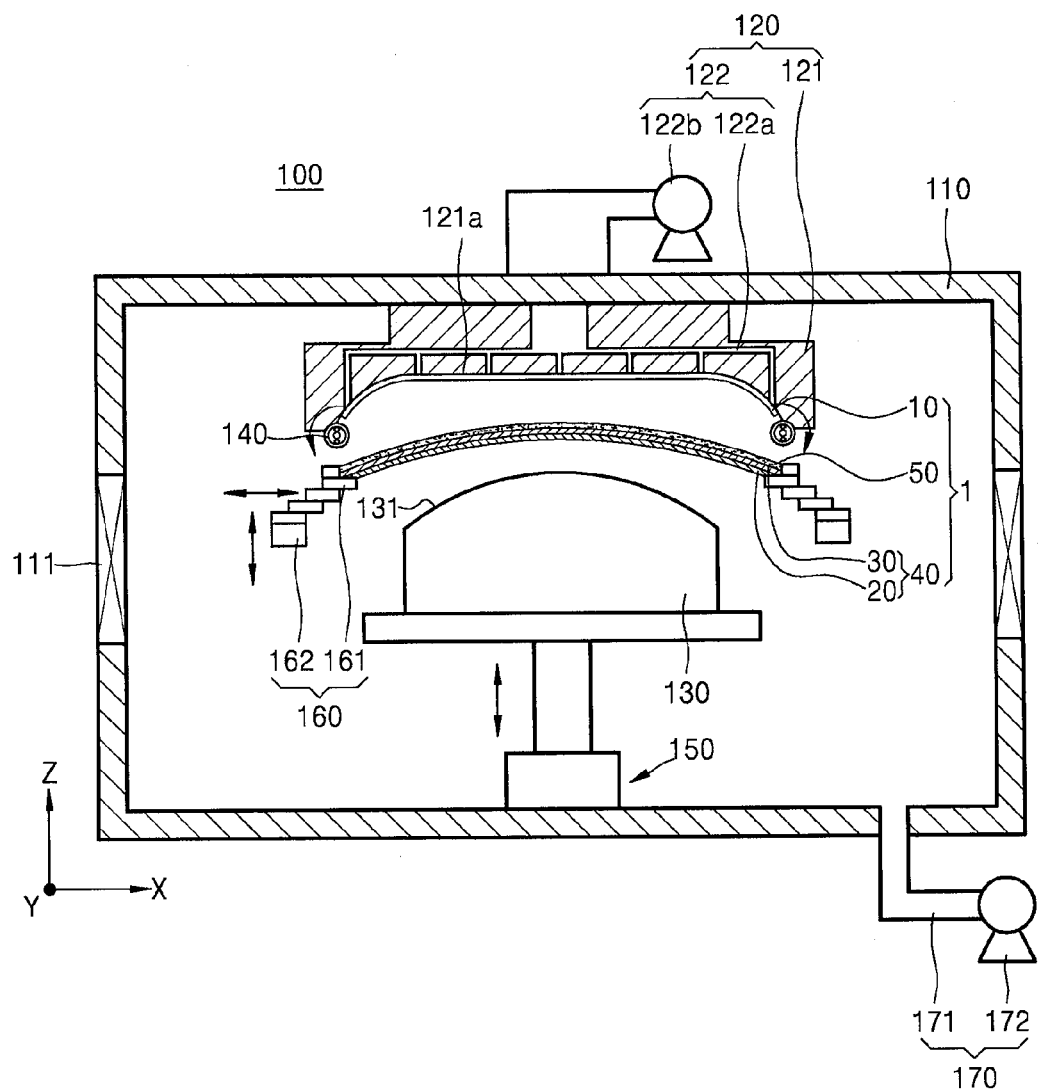
FIG. 1 is a cross-sectional view of an apparatus for manufacturing a display apparatus according to an embodiment.

Reference will now be made in detail to embodiments, examples of which are illustrated in the accompanying drawings, wherein like reference numerals refer to like elements throughout. The presented embodiments may have different forms and should not be construed as being limited to the descriptions set forth herein. Accordingly, certain exemplary embodiments are merely described below, by referring to the figures, to explain aspects of the present description.

As used herein, the term "and/or" includes any and all combinations of one or more of the associated listed items. Expressions, such as "at least one of," when preceding a list of elements, modify the entire list of elements and do not modify the individual elements of the list. Further, the use of "may" when describing embodiments of the present invention relates to "one or more embodiments of the present invention." Also, the term "exemplary" is intended to refer to an example or illustration. As used herein, the terms "use," "using," and "used" may be considered synonymous with the terms "utilize," "utilizing," and "utilized," respectively.

It will be understood that although the terms "first," "second," etc. may be used herein to describe various components, but these components should not be limited by these terms. These terms are used to distinguish one component from another. And, as used herein, the singular forms "a" and "an" are intended to include the plural forms as well, unless the context clearly indicates otherwise. It will be further understood that the terms "includes," "including," "comprises," and/or "comprising" used herein specify the presence of stated features or components but do not preclude the presence or addition of one or more other features or components.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

It will be understood that when a layer, region, or component is referred to as being "on" or "formed on" another layer, region, or component, it can be directly or indirectly on or formed on the other layer, region, or component. When an element is referred to as being "directly on" or "directly formed on" another layer, region, or component, there are no intervening layers, regions, or components present. For example, when a first element is described as being "on" or "formed on" a second element, the first element may be directly on or formed on the second element or the first element may be indirectly on or formed on the second element via one or more intervening elements.

Sizes of components in the drawings may be exaggerated for convenience of explanation. Because sizes and thicknesses of components in the drawings may be arbitrarily illustrated for convenience of explanation, the following embodiments are not limited thereto.

In the following examples, the x-axis, the y-axis, and the z-axis are not limited to three axes of the rectangular coordinate system and may be interpreted in a broader sense. For example, the x-axis, the y-axis, and the z-axis may be perpendicular to one another or may represent different directions that are not perpendicular to one another.

When a certain embodiment may be implemented differently, a specific process order may be performed differently from the described order. For example, two consecutively described processes may be performed at substantially the same time (concurrently) or performed in an order opposite to the described order.

Figure 2:
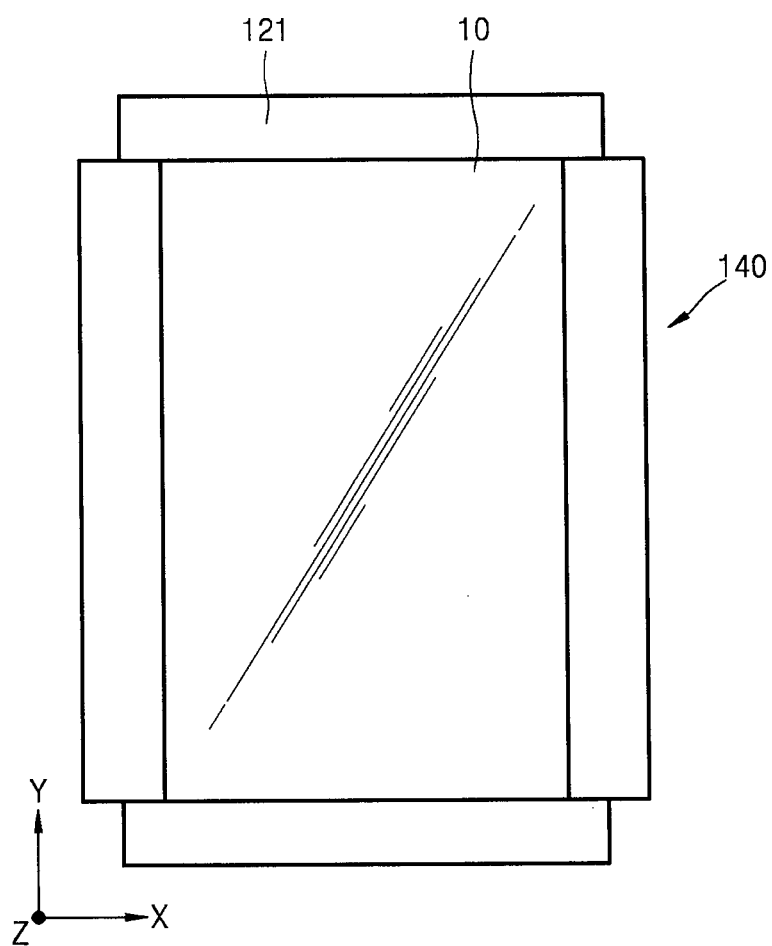
FIG. 2 is a rear view of a first mold and a guide roller illustrated in FIG. 1.
Figure 3:
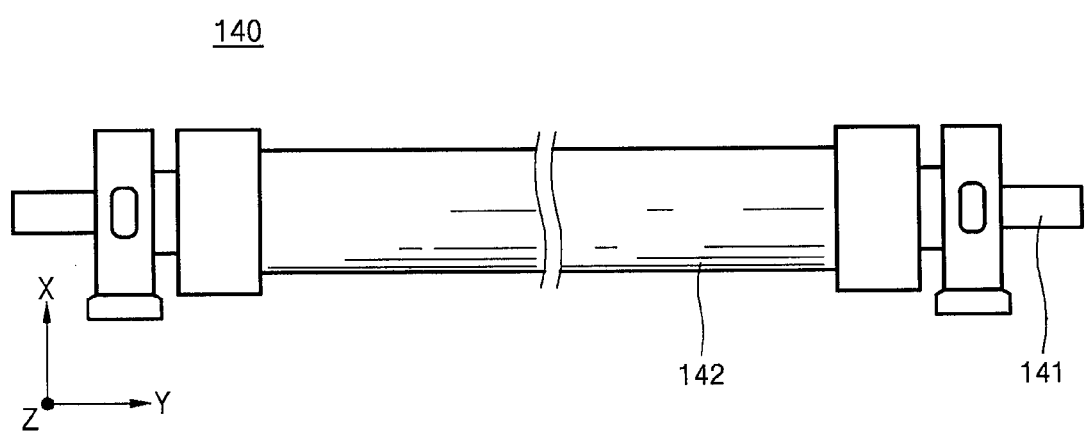
FIG. 3 is a front view of the guide roller illustrated in FIG. 1.
Figure 4:
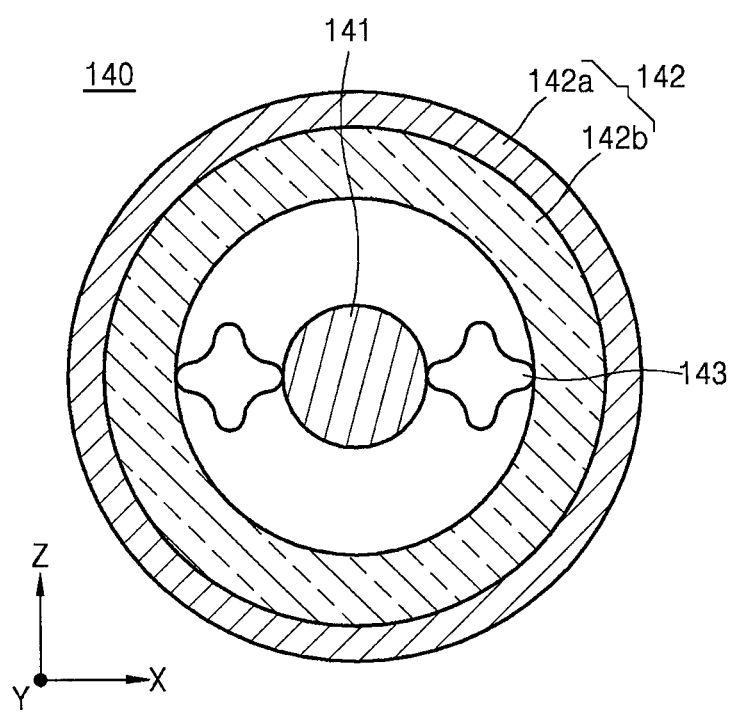
FIG. 4 is a cross-sectional view of the guide roller illustrated in FIG. 3.

FIG. 1 is a cross-sectional view of a manufacturing apparatus 100 for a display apparatus according to an embodiment. FIG. 2 is a rear view of a first mold 120 and a guide roller 140 illustrated in FIG. 1. FIG. 3 is a front view of the guide roller 140 illustrated in FIG. 1. FIG. 4 is a cross-sectional view of the guide roller 140 illustrated in FIG. 3.

Referring to FIGS. 1-4, the manufacturing apparatus 100 for the display apparatus includes a chamber 110, the first mold 120, a second mold 130, the guide roller 140, a driver 150, a supporter 160, and a suction unit 170 (e.g., a vacuum or a pump).

The chamber 110 may include a space therein and may have an opening. In one or more embodiments, a gate valve 111 is provided at the opening of the chamber 110 to selectively close/open the opening of the chamber 110.

The first mold 120 and the second mold 130 may be provided in the chamber 110. In one or more embodiments, at least one of the first mold 120 and the second mold 130 may linearly move in the chamber 110.

A window 10 may be mounted on the first mold 120. The first mold 120 may include a first mold body 121 on which the window 10 is mounted. The first mold body 121 may include a first mounting surface 121a on which the window 10 is mounted.

The window 10 may be at least partially curved. For example, the window 10 may have an arc shape with a radius of curvature. In another embodiment, the window 10 may have a curved surface (e.g., the window 10 may be formed as a continuously curved surface) having a plurality of radii of curvature (e.g., a plurality of different radii of curvature). In another embodiment, the window 10 may have an oval surface. In another embodiment, the window 10 may have at least one curved end portion. In one or more embodiments, a center portion of the window 10 may be flat or substantially flat and at least one end portion of the window 10 may be curved. For example, an end of the window 10 in a lengthwise direction thereof (e.g., an X direction or a Y direction in FIG. 1) may be curved. In another embodiment, an end of the window 10 in a width direction thereof (e.g., the other of the X direction and the Y direction of FIG. 1) may be curved.

The first mounting surface 121a of the first mold 120 may correspond to (e.g., may have a shape corresponding to) an external surface of the window 10. For example, the external surface of the window 10 may be mounted on the first mounting surface 121a of the first mold 120.

The first mold 120 may include a first fixer 122 that is provided on the first mold body 121 to fix or adhere the window 10 onto the first mounting surface 121a. The first fixer 122 may be provided in various shapes and may be any suitable device. For example, the first fixer 122 may include an electrostatic chuck or an adhesive chuck. In another embodiment, the first fixer 122 may include a first suction path 122a provided in the first mold body 121 and a first suction pump 122b connected to the first suction path 122a to suck a gas from or through the first suction path 122a. In another embodiment, the first fixer 122 may be a clamp, a ring, a protrusion, etc. for fixing or mounting the window 10 to the first mounting surface 121a. Hereinafter, for convenience of description, an embodiment in which the first fixer 122 includes the first suction path 122a and the first suction pump 122b will be further described.

The second mold 130 may face the first mold 120. The second mold 130 may include an elastic material. For example, the second mold 130 may include rubber, silicone, urethane, etc. Hereinafter, for convenience of description, an embodiment in which the second mold 130 includes silicone will be further described.

The second mold 130 may be formed as a silicone pad. In one or more embodiments, a second contact surface 131 of the second mold 130, which contacts a panel member 40, may be similar to (e.g., may have a similar or corresponding shape as that of) a surface of the window 10. In addition, the second contact surface 131 may be at least partially curved so that the panel member 40 may be attached to the window 10.

The panel member 40 may have various shapes and components. For example, the panel member 40 may include a display panel 20, a touch panel 30, and/or a functional film. The functional film may include a film attached to the window 10 and may display or implement images, letters, etc. In other embodiments, the functional film may include a film that reinforces the display panel 20, the touch panel 30, and/or the window 10. In another embodiment, the functional film may include a film that is attached to the window 10 to prevent scratches from occurring due to an external force. Hereinafter, for convenience of description, an embodiment in which the panel member 40 includes the display panel 20 and the touch panel 30 will be further described below.

The panel member 40 may be flexible. For example, the shape of the panel member 40 may be varied or changed due to application of a certain degree of force and may return to its original shape when the force is reduced or removed therefrom.

The second mold 130 may be spaced from (e.g., spaced apart from) or adjacent to the first mold 120. When the second mold 130 is adjacent to the first mold 120, the window 10 and the panel member 40 may be bonded to each other. Because the shape of the second mold 130 is variable, the window 10 and the panel member 40 may be sequentially bonded to each other from a portion (e.g., a center portion) of the window 10 toward an end or ends of the window 10.

In addition, the guide roller 140 may be rotatably provided on or mounted to the second mold 130. The guide roller 140 may maintain tension in the panel member 40 when the window 10 and the panel member 40 are bonded to each other.

The guide roller 140 may rotate when an external force applied to the panel member 40 and to the guide roller 140 is equal to or greater than a certain value when the window 10 and the panel member 40 are bonded to each other. Also, the guide roller 140 may rotate at a constant or substantially constant speed (e.g., at a constant or substantially constant number of revolutions per unit time) after starting to rotate.

The guide roller 140 may be arranged above (e.g., may be arranged in parallel with) the curved end of the panel member 40. The guide roller 140 may be provided at an end portion of the first mold 120. For example, the guide roller 140 may be rotatably provided on or mounted to the first mold 120 at where the first mounting surface 121a of the first mold 120 starts (e.g., at an end or edge of the first mounting surface 121a of the first mold 120).

Two guide rollers 140 may be provided facing each other. The two guide rollers 140 may be disposed at opposite ends of the window 10 (e.g., the two guide rollers 140 may be at opposite ends or edges of the first mounting surface 121a of the first mold 120).

Each of the guide rollers 140 may include a shaft 141 fixed on the first mold 120 and a roller body 142 rotatably mounted to or provided on the shaft 141. Also, the guide roller 140 may include a friction portion 143 disposed between the roller body 142 and the shaft 141 and in contact with the shaft 141.

The roller body 142 may include a core 142a (e.g., a core unit) rotatably provided on the shaft 141 (e.g., provided on the friction portion 143). The roller body 142 may also include an outer cover 142b (e.g., an outer cover portion) formed or disposed on the core 142a. The core 142a may include a metal material. The outer cover 142b may be formed or disposed to surround (e.g., disposed to surround an outer surface of) the core 142a. For example, the outer cover 142b may include a material, such as rubber, silicone, and urethane. In other embodiments, the outer cover 142b may be formed as a fluorine coating or a silicone coating on a surface of the core 142a. The outer cover 142b contacts the panel member 40 to a frictional force to the panel member 40 in order to maintain tension in the panel member 40.

The friction portion 143 may be connected to (e.g., may be fixedly connected to) the core 142a or the shaft 141. The friction portion 143 may prevent or restrict rotation of the core 142a by contacting the core 142a and/or the shaft 141 when the core 142a attempts to rotate (e.g., when an external force is applied to the core 142a). However, when a certain external force or greater is applied to the core 142a, the external force may be greater than the frictional force between the friction portion 143 and the core 142a or the frictional force between the friction portion 143 and the shaft 141, thereby causing the core 142a to rotate.

The driver 150 may be connected to at least one of the first mold 120 and the second mold 130 to linearly move the at least one of the first mold 120 and the second mold 130. The driver 150 moves the first mold 120 and the second mold 130 relative to each other. For example, the driver 150 may linearly move the second mold 130 when the first mold 120 is stationary (or stops moving). In another embodiment, the driver 150 may linearly move the first mold 120 when the second mold 130 is stationary (or stops moving). In another embodiment, the driver 150 may linearly move each of the first mold 120 and the second mold 130. Hereinafter, for convenience of description, an embodiment in which the driver 150 is connected to the second mold 130 to linearly move the second mold 130 will be further described below in detail.

The driver 150 may include a cylinder connected to the second mold 130. In another embodiment, the driver 150 may include a motor and a ball screw connected to the motor. In this embodiment, the ball screw may be partially inserted into the second mold 130. In another embodiment, the driver 150 may include a linear motor connected to the second mold 130. However, the driver 150 is not limited to the above examples and may include all kinds of suitable devices that may linearly move the second mold 130. Hereinafter, for convenience of description, an embodiment in which the driver 150 includes the cylinder will be described further below in detail.

Opposite ends of the panel member 40 may be mounted on the supporter 160. The supporter 160 may include a mounting portion 161, on which the panel member 40 is mounted, and a linear driver 162 that linearly moves the mounting portion 161.

The mounting portion 161 may be formed in multiple stages (e.g., may include a plurality of individual sections or portions) in order to prevent the panel member 40 and the mounting portion 161 from becoming separated from each other (e.g., from being spaced from or spaced apart from each other) after the ends of the panel member 40 are mounted thereon. Also, the linear driver 162 is connected to the mounting portion 161 so as to linearly move the mounting portion 161 in at least one of a first direction (e.g., a Z direction in FIG. 1) and a second direction (e.g., an X direction in FIG. 1). The first direction and the second direction may be different from each other (e.g., the first direction and the second direction may be perpendicular to each other). Also, the first direction may be a direction between (e.g., extending between) the first mold 120 and the second mold 130, and the second direction may be parallel to the ground. The linear driver 162 may include a cylinder. In another embodiment, the linear driver 162 may include a linear motor. In another embodiment, the linear driver 162 may include a robot arm. However, the linear driver 162 is not limited to the above examples and may include any kind of suitable structure and device provided that the mounting portion 161 may be linearly moved in various directions. For convenience of description, an embodiment in which the linear driver 162 includes the robot arm will be further described below.

The suction unit 170 may be connected to the chamber 110. The suction unit 170 may include a connecting pipe 171 connected to (e.g., open to) the chamber 110 and a pump 172 provided at (e.g., in communication with) the connecting pipe 171.

Figure 5:
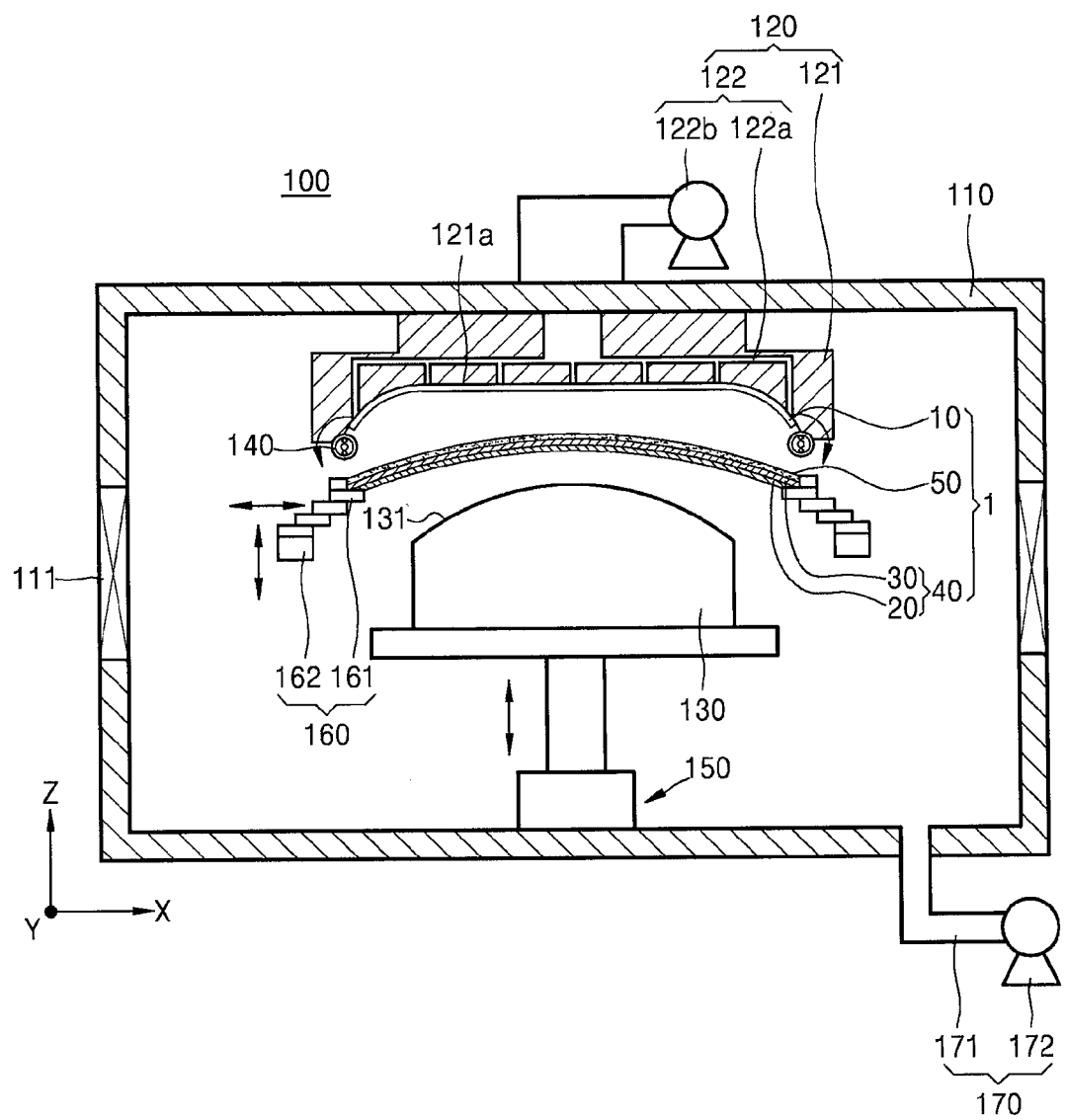
FIG. 5 is an operating diagram illustrating a first operation of the apparatus for manufacturing the display apparatus illustrated in FIG. 1.
Figure 6:
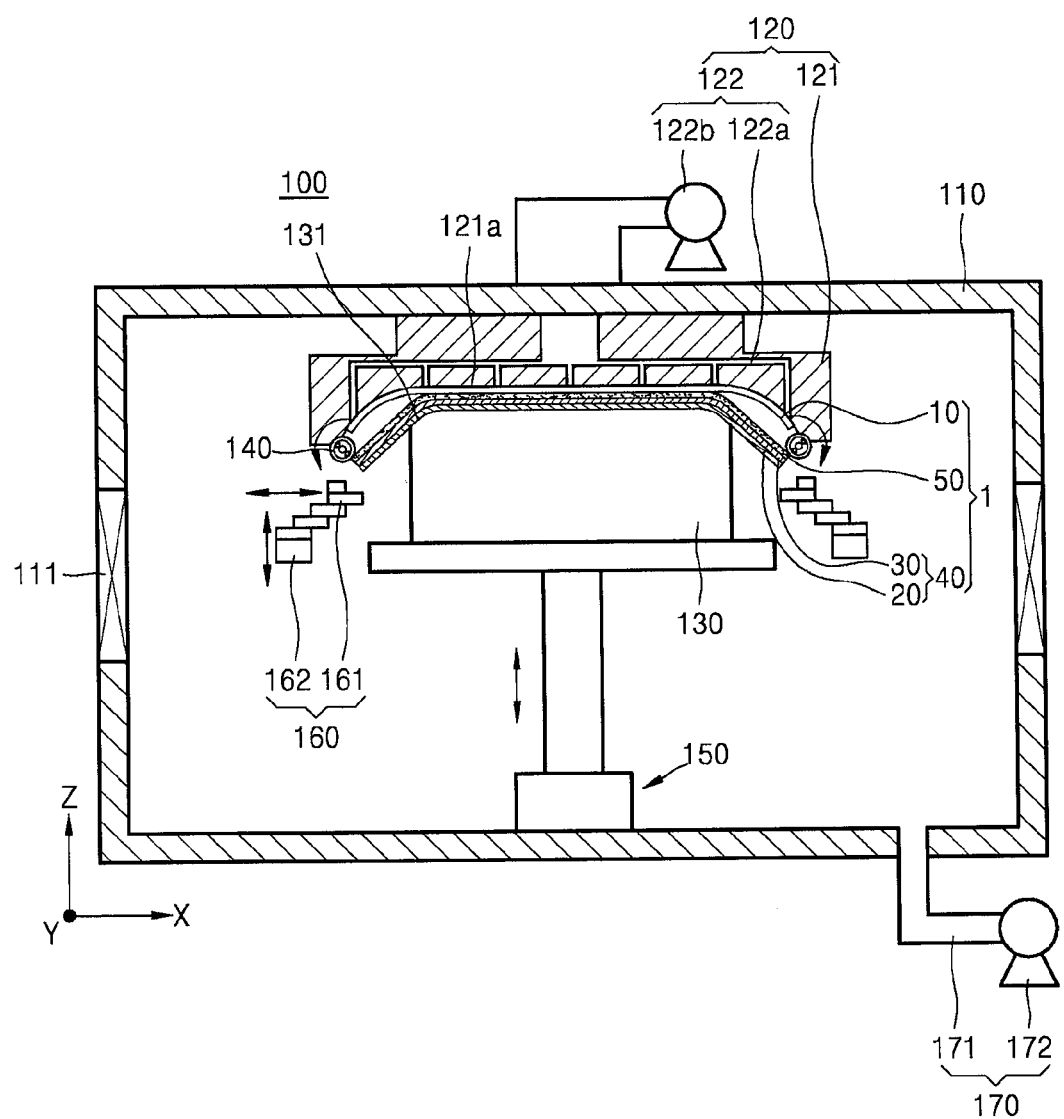
FIG. 6 is an operating diagram illustrating a second operation of the apparatus for manufacturing the display apparatus illustrated in FIG. 1.
Figure 7:
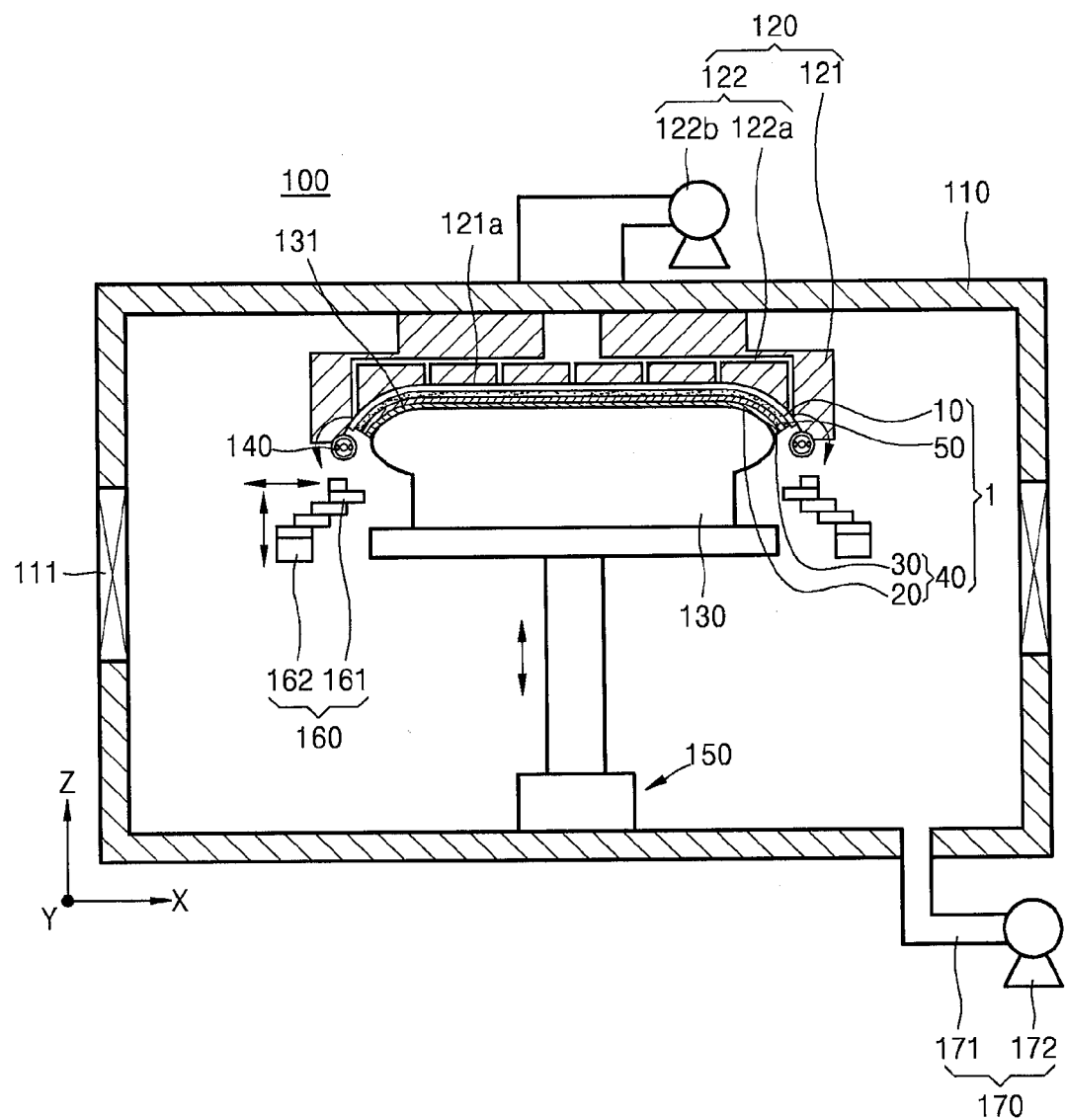
FIG. 7 is an operating diagram illustrating a third operation of the apparatus for manufacturing the display apparatus illustrated in FIG. 1.

FIG. 5 is an operating diagram illustrating a first operation of the manufacturing apparatus 100 illustrated in FIG. 1, FIG. 6 is an operating diagram illustrating a second operation of the manufacturing apparatus 100 illustrated in FIG. 1, and FIG. 7 is an operating diagram illustrating a third operation of the manufacturing apparatus 100 illustrated in FIG. 1.

Referring to FIGS. 5-7, a pressure inside the chamber 110 may be maintained at an atmospheric pressure level via the pump 172.

The gate valve 111 opens the opening of the chamber 110, and the window 10 and the panel member 40 may be carried into the chamber 110 from outside. In some embodiments, the window 10 and the panel member 40 may enter the chamber 110 via the robot arm.

The window 10 may be mounted on the first mold 120 disposed in the chamber 110. When the window 10 is mounted on the first mounting surface 121a of the first mold 120, the first suction pump 122b operates to suck or remove a gas from the first suction path 122a so that the window 10 may be adhered to (e.g., completely adhered to) the first mounting surface 121a. The first suction path 122a may extend or penetrate through the first mounting surface 121a of the first mold 120.

The panel member 40 may be mounted on the mounting portion 161. The panel member 40 may be disposed flat (e.g., may be disposed in a flat orientation) between the mounting portions 161 which face each other.

The panel member 40 may include the display panel 20 and the touch panel 30 bonded to each other. Also, an adhesive member 50 may be disposed on the panel member 40. The adhesive member 50 may include an optically clear adhesive (OCA). The OCA may be a film type adhesive or may be applied onto the panel member 40.

In other embodiments, the adhesive member 50 may not be disposed on the panel member 40 and may be disposed on the window 10.

In addition, when the arranging of the panel member 40 and the window 10 is finished, the linear driver 162 operates to move the mounting portions 161, which are spaced from each other, toward each other.

When the mounting portions 161 approach each other to have a certain distance (e.g., a predetermined distance) therebetween in the second direction, the panel member 40 may be transformed to be curved (e.g., the panel member 40 may be bent). For example, a portion of the panel member 40 (e.g., a center portion of the panel member 40) may protrude toward the window 10.

When the mounting portions 161 are spaced from each other by a certain distance, the linear driver 162 does not move the mounting portions 161 in the second direction any further (e.g., stops moving the mounting portions 161 in the second direction) and, then, linearly moves the mounting portions 161 in the first direction.

The linear driver 162 may move the mounting portions 161 a certain distance (e.g., a predetermined distance) in the first direction and, then, may stop (or may stop operating). At this time, the protruding portion of the panel member 40 may be attached to a portion of the window 10. In the above-described embodiment, the driver 150 may operate to move the second mold 130 toward the first mold 120. For example, due to the operation of the driver 150, the second mold 130 may allow the protruding portion of the panel member 40 to be attached to the window 10 as described above.

The linear driver 162 may move the mounting portions 161 in a direction opposite to the above-described directions (e.g., opposite to the first direction and opposite to the second direction) so that the opposite ends of the panel member 40 may separate from the mounting portions 161. Due to an elastic force of the panel member 40, the opposite ends of the panel member 40 may be moved toward the first mold 120. As this occurs, the opposite ends of the panel member 40 may come into contact with (e.g., may be attached to) the guide rollers 140 (see FIG. 6).

For example, if the guide rollers 140 were omitted, the panel member 40 may come into contact with (e.g., may be attached to) the first mold 120. For example, the panel member 40 may come into contact with the ends of the first mounting surface 121a of the first mold 120. In this case, the opposite ends of the panel member 40 may come into contact with (e.g., may be attached to) the window 10 or the first mold 120 (e.g., the opposite ends of the panel member 40 may come into contact with the window 10 or the first mold 120 before or at substantially the same time as the center portion of the panel member 40 comes into contact with the window 10), and thus, a gap may be present between portions of the panel member 40 and the window 10. Such gaps may form bubbles, and bubbles may be a cause of defects when the panel member 40 and the window 10 are bonded to each other. However, when the guide rollers 140 are provided as in at least some of the above-described embodiments, the opposite ends of the panel member 40 contact the guide rollers 140 so that the portion (e.g., an outer portion) of the panel member 40 other than the portion that is firstly attached to the window 10 (e.g., the center portion of the panel member 40) may not contact (or may not firstly contact) the window 10 or the first mold 120.

While the linear driver 162 operates, the driver 150 may linearly move the second mold 130 toward the first mold 120. When the driver 150 operates (e.g., continuously operates), the second mold 130 may press the panel member 40 toward the window 10 while the second mold 130 contacts the panel member 40.

When the driver 150 moves (e.g., continuously moves) the second mold 130 in the first direction, the second mold 130 sequentially bonds (e.g., is transformed to sequentially bond) the panel member 40 to the window 10 from the portion protruded toward the window 10 (e.g., the center portion of the panel member 40) outwardly toward the opposite ends of the panel member 40.

While the above processes are performed, the guide rollers 140 may not rotate (or may remain stationary). For example, when the window 10 and the panel member 40 are sequentially bonded to each other, the guide rollers 140 may not rotate so as to maintain the tension in the panel member 40.

After that, when a certain amount of (e.g., a certain surface area of) the panel member 40 and the window 10 are bonded to each other, the guide rollers 140 rotate (begin to rotate) to move the opposite ends of the panel member 40 toward the window 10. For example, the guide rollers 140 may start to rotate when the second mold 130 reaches a certain location (e.g., a predetermined location). As the guide rollers 140 rotate, the driver 150 may continue to operate (or continue to move), and the second mold 130 is transformed to sequentially attach the window 10 to the panel member 40.

As described above, when the driver 150 operates (e.g., continuously operates), the panel member 40 escapes completely from the guide rollers 140 (e.g., moves past or beyond the guide rollers 140), and due to the transformation of the second mold 130, the opposite ends of the panel member 40 may be bonded (e.g., completely bonded) to the window 10 (see FIG. 7).

Therefore, according to embodiments of the manufacturing apparatus 100 and the method of manufacturing the display apparatus described above, the panel member 40 and the window 10 may be sequentially bonded to each other from a portion (e.g., a center portion) of the panel member 40 toward the opposite ends of the panel member 40 so as to prevent bubbles from being generated (or to reduce the occurrence of bubbles being generated) between the panel member 40 and the window 10, and accordingly, a display apparatus 1 having excellent quality may be manufactured.

Also, according to embodiments of the manufacturing apparatus 100 and the method of manufacturing the display apparatus, damage to the adhesive member 50 at the opposite ends of the panel member 40 may be reduced when the panel member 40 and the window 10 are bonded to each other.

Figure 8:
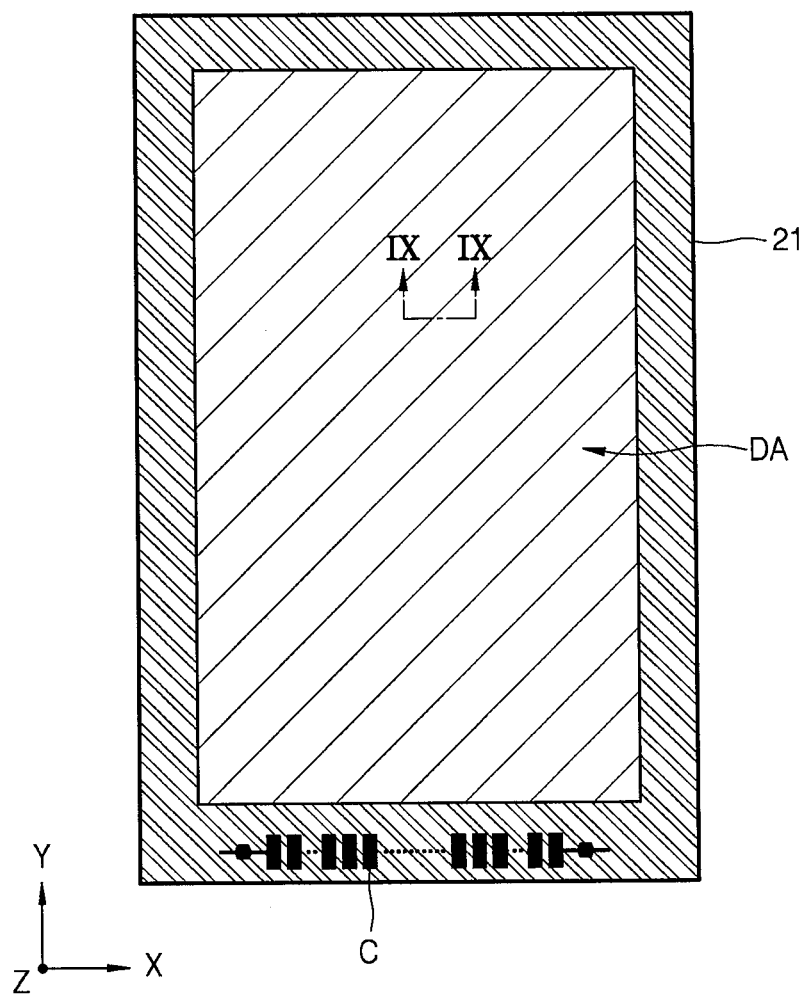
FIG. 8 is a plan view of a display panel illustrated in FIG. 1.
Figure 9:
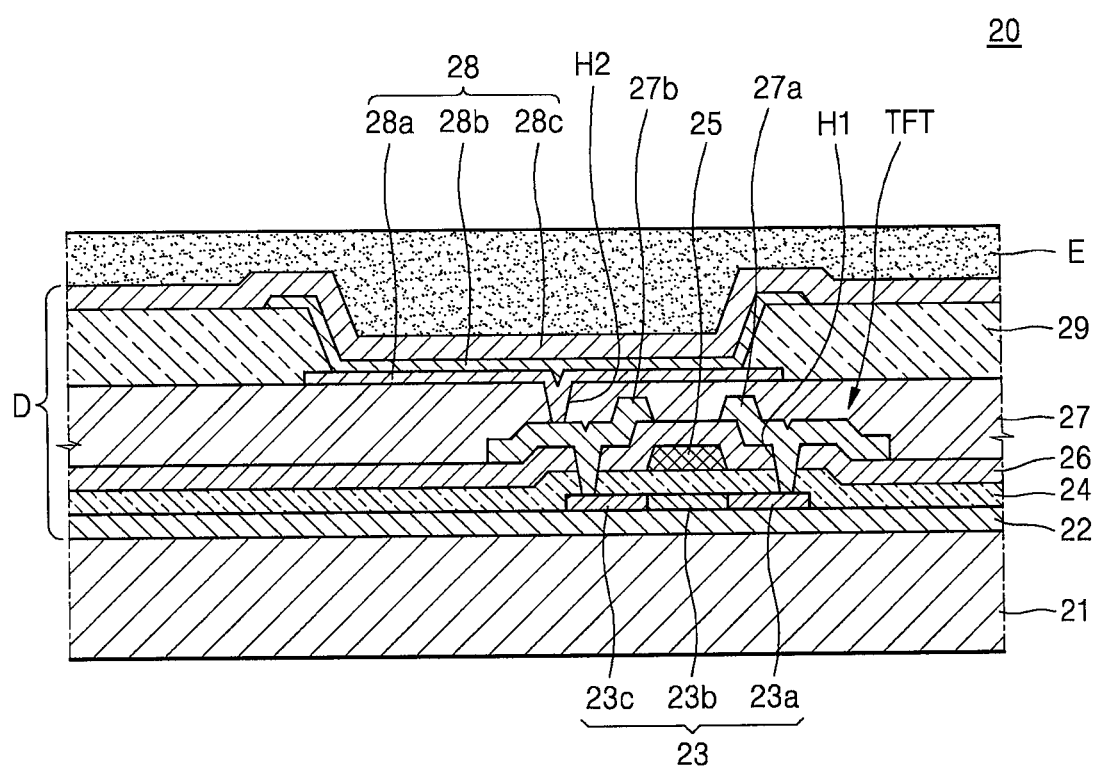
FIG. 9 is a cross-sectional view of the display panel taken along the line IX-IX of FIG. 8.

FIG. 8 is a plan view of the display panel 20 illustrated in FIG. 1, and FIG. 9 is a cross-sectional view of the display panel 20 taken along the line IX-IX of FIG. 8.

Referring to FIGS. 8 and 9, a display area DA may be defined on a substrate 21 and a non-display area may be defined at an outer portion of (e.g., surrounding a periphery of) the display area DA. A display unit D is disposed on the display area DA, and power lines may be arranged on the non-display area. In addition, a pad portion C may be disposed on the non-display area.

The display panel 20 may include the substrate 21, the display unit D, and a thin film encapsulation layer E. Various layers may be disposed on the substrate 21. The substrate 21 may include a plastic material or a metal material, such as stainless steel (SUS) and titanium (Ti). In addition, the substrate 21 may include polyimide (PI). Hereinafter, an embodiment in which the substrate 21 includes PI will be further described below for convenience of description.

The display unit D may be formed on the substrate 21. In some embodiments, the display unit D includes a thin film transistor TFT, a passivation layer 27 covering the thin film transistor TFT, and an organic light-emitting diode (OLED) 28 on the passivation layer 27.

A buffer layer 22 including an organic compound and/or an inorganic compound is further formed on the substrate 21, and for example, the buffer layer 22 may include $SiO_x$ ($x \geq 1$) or $SiN_x$ ($x \geq 1$).

An active layer 23 is formed on the buffer layer 22 in a certain pattern (e.g., a predetermined pattern), and then, the active layer 23 is buried by (or under) a gate insulating layer 24. The active layer 23 includes a source region 23a, a drain region 23c, and a channel region 23b between the source region 23a and the drain region 23c.

The active layer 23 may include various materials. For example, the active layer 23 may include an inorganic semiconductor material, such as amorphous silicon or crystalline silicon. In another embodiment, the active layer 23 may include an oxide semiconductor. In another embodiment, the active layer 23 may include an organic semiconductor material. Hereinafter, for convenience of description, an embodiment in which the active layer 23 includes the amorphous silicon will be further described below.

The active layer 23 may be obtained by forming an amorphous silicon layer on the buffer layer 22, crystallizing the amorphous silicon layer to be a polycrystalline silicon layer, and patterning the polycrystalline silicon layer. The source region 23a and the drain region 23c of the active layer 23 are doped with impurities according to a kind of the thin film transistor (TFT) (e.g., a driving TFT or a switching TFT).

A gate electrode 25 corresponding to the active layer 23 and an interlayer insulating layer 26 burying the gate electrode 25 are formed on the gate insulating layer 24.

In addition, after forming a contact opening H1 (e.g., a contact hole) in the interlayer insulating layer 26 and the gate insulating layer 24, a source electrode 27a and a drain electrode 27b are formed on the interlayer insulating layer 26 to respectively contact the source region, 23a and the drain region 23c.

The passivation layer 27 is formed on the thin film transistor TFT, and a pixel electrode 28a of the OLED 28 is formed on the passivation layer 27. The pixel electrode 28a contacts the drain electrode 27b of the thin film transistor TFT through a via opening H2 (e.g., a via hole) formed in the passivation layer 27. The passivation layer 27 may be formed to have a single-layered structure or multi-layered structure including an inorganic material and/or an organic material. The passivation layer 27 may be formed as a planarization layer to provide a flat or substantially flat upper surface without regard to irregular or uneven lower layers, but in another embodiment, the passivation layer 27 may be formed according to a shape of the lower layers. In addition, the passivation layer 27 may include a transparent insulating material in order to achieve a resonant effect.

After forming the pixel electrode 28a on the passivation layer 27, a pixel defining layer 29 including an organic material and/or an inorganic material is formed to cover the pixel electrode 28a and the passivation layer 27, and the pixel defining layer has an opening exposing the pixel electrode 28a.

In addition, an intermediate layer 28b and an opposite electrode 28c are formed at least on the pixel electrode 28a.

In some embodiments, the pixel electrode 28a functions as an anode electrode and the opposite electrode 28c functions as a cathode electrode, but the present invention is not limited thereto. In another embodiment, the pixel electrode 28a may function as the cathode electrode and the opposite electrode 28c may function as the anode electrode.

The pixel electrode 28a and the opposite electrode 28c are insulated from each other via the intermediate layer 28b and apply voltages of different polarities to the intermediate layer 28b so that an organic emission layer emits light.

The intermediate layer 28b includes the organic emission layer. In other embodiments, the intermediate layer 28b includes the organic emission layer and may further include a hole injection layer, a hole transport layer, an electron transport layer, and/or an electron injection layer. However, the present invention is not limited thereto, and the intermediate layer 28b may include an organic emission layer and may further include other, various functional layers.

A unit pixel includes a plurality of sub-pixels that may respectively emit light of various colors. For example, the sub-pixels may include sub-pixels that respectively emit red, green, and blue light or sub-pixels that emit respectively red, green, blue, and white light.

The thin film encapsulation layer E may include a plurality of inorganic layers or may include an inorganic layer and an organic layer.

The organic layer of the thin film encapsulation layer E includes a polymer and may be a single layer or a multi-layer stack including polyethylene terephthalate, polyimide, polycarbonate, epoxy, polyethylene, and/or polyacrylate. The organic layer may include polyacrylate and, in one embodiment, may include a polymerized monomer composition including diacrylate-based monomer and triacrylate-based monomer. The monomer composition may further include monoacrylate-based monomer. Also, the monomer composition may further include a well-known photoinitiator, such as trimethylbenzoyl diphenylphosphine oxide (TPO), but the present invention is not limited thereto.

The inorganic layer of the thin film encapsulation layer E may be a single layer or a multi-layer stack including a metal oxide and/or a metal nitride. For example, the inorganic layer may include $SiN_x$, $Al_2O_3$, $SiO_2$, and/or $TiO_2$.

The top layer of the thin film encapsulation layer E that is exposed to the outside may include an inorganic layer in order to prevent or reduce intrusion of moisture into the OLED.

The thin film encapsulation layer E may include at least one sandwich structure in which at least one organic layer is between (e.g., is formed between) at least two inorganic layers. In another embodiment, the thin film encapsulation layer E may include at least one sandwich structure in which at least one inorganic layer is between at least two organic layers. In another embodiment, the thin film encapsulation layer E may include a sandwich structure in which at least one organic layer is between at least two inorganic layers and another sandwich structure in which at least one inorganic layer is between at least two organic layers.

The thin film encapsulation layer E may include a first inorganic layer, a first organic layer, and a second inorganic layer sequentially formed from a top (e.g., from a top portion) of the organic light-emitting device (OLED).

In another embodiment, the thin film encapsulation layer E may include a first inorganic layer, a first organic layer, a second inorganic layer, a second organic layer, and a third inorganic layer sequentially formed from the top of the OLED.

In another embodiment, the thin film encapsulation layer E may include a first inorganic layer, a first organic layer, a second inorganic layer, a second organic layer, a third inorganic layer, a third organic layer, and a fourth inorganic layer from the top of the OLED.

A halogenized metal layer including, for example, lithium fluoride (LiF), may be further included between the OLED and the first inorganic layer. The halogenized metal layer may prevent the OLED from being damaged or may reduce damage to the OLED when the first inorganic layer is formed by a sputtering method.

The first organic layer may be smaller than the second inorganic layer, and the second organic layer may be smaller than the third inorganic layer.

According to one or more embodiments, the panel member and the window may be sequentially bonded to each other from a portion (e.g., a center portion) of the window to opposite ends of the window.

According to one or more embodiments, a display apparatus having excellent quality may be manufactured. In addition, according to one or more embodiments, loss of or damage to the adhesive member at the opposite ends of the panel member may be reduced to improve a bonding ratio (or bonding strength) between the opposite ends of the panel member and the window.

According to one or more embodiments, tension in the panel member may be maintained when bonding the panel member and the window to each other, thereby preventing or reducing the occurrence of bubbles being generated between the panel member and the window.

It should be understood that embodiments described herein should be considered in a descriptive sense and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the present invention as defined by the following claims and their equivalents.

What is claimed is:

1. An apparatus for manufacturing a display apparatus, the apparatus comprising:
    a first mold configured to accommodate a window;
    a second mold configured to accommodate a panel member and to bond the window and the panel member to each other, the second mold facing the first mold and having a variable shape; and
    a guide roller on the first mold, the guide roller being rotatable and configured to maintain tension in the panel member as the window and the panel member are bonded to each other.

2. The apparatus of claim 1, further comprising a driver connected to at least one of the first mold and the second mold and configured to move the first mold and the second mold relative to each other.

3. The apparatus of claim 1, wherein the guide roller is arranged to contact an end of the panel member.

4. The apparatus of claim 1, wherein the second mold comprises silicone.

5. The apparatus of claim 1, wherein the guide roller is configured to rotate when the second mold reaches a certain location.

6. The apparatus of claim 1, wherein the guide roller comprises:

a core; and an outer cover on an external surface of the core.

7. The apparatus of claim 1, further comprising a support between the first mold and the second mold to support opposite ends of the panel member.

8. The apparatus of claim 1, wherein the panel member is flexible.

9. The apparatus of claim 1, wherein the panel member comprises a display panel, a touch panel, and/or a functional film.

\* \* \* \* \*